Patented June 8, 1937

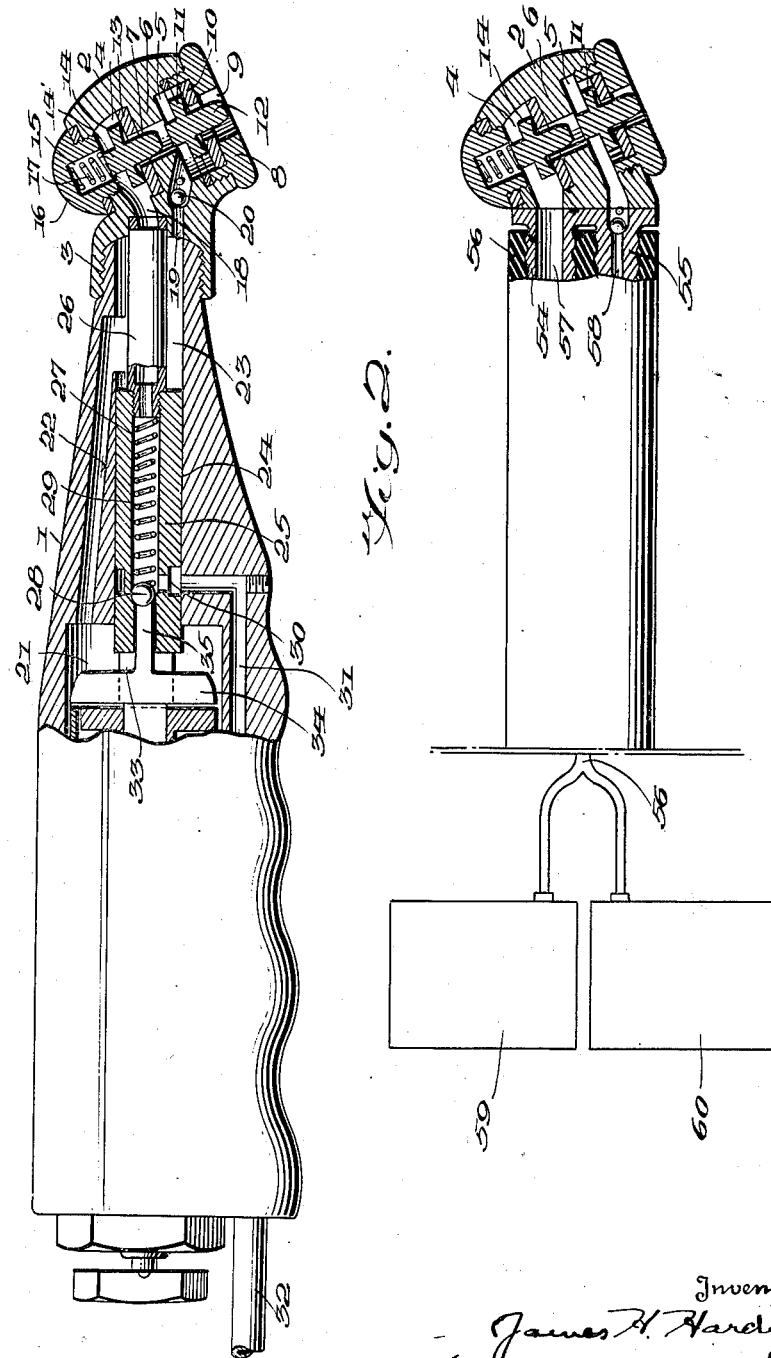

2,082,886

UNITED STATES PATENT OFFICE 2,082,886

AIR DELIVERY DEVICE

James Harris Hardy, Columbus, Miss., assignor to Precision Air Gauge Company, Columbus, Miss., a corporation of Mississippi Original application December 13, 1933, Serial No. 702,239. Divided and this application July 2, 1936, Serial No. 88,691

6 Claims. (Cl. 277—42)

This invention relates to an improvement in air delivery devices, such as may be employed for the inflation of pneumatic tires, and more particularly to a double-chuck for a tire inflating hose or gas mixing supply device.

The principal object of the present invention is to provide for the mixing of different gases or air under different pressures in a double chuck or supply device by making provision for automatic connection of the different gases or air under different pressures according to the position of the supply device.

A further object of the invention is to provide a nozzle for inflating a pneumatic tire capable of delivering high or low pressure to the tire, at the will of the operator. The nozzle is adapted to be connected with a source of high pressure, and under the control of the operator, this high pressure may be connected directly with the tire for speedy inflation thereof. A source of low pressure may be connected with the nozzle, so as to be used to inflate the tire, as for instance, when the tire is inflated to almost normal pressure. The low pressure connection may be through the pressure gauge, if desired, or direct with a source of low pressure.

The invention is illustrated in different embodiments in the accompanying drawing, in which:

Fig. 1 is a side elevation of an air delivery device, with a portion thereof in section; and Fig. 2 is a partial sectional view and diagrammatic view of a different form of double chuck, as used on a fluid supply hose.

As shown in Fig. 1, the assembly comprises a casing 1 of a size and shape that it may be gripped in the hand of an operator and has a head 2 of a nozzle connected therewith, as by screw-threads 3, the connection being tightly packed, so as to prevent the escape of air therethrough.

The head of the nozzle has high and low pressure chambers 4 and 5 therein, separated by a wall 6 having an opening 7 therethrough. The chamber 5 is partly closed at its lower side by means of a cap 8, provided with a central opening 9 therethrough, of a size and shape adapted to receive the upper end of the valve stem of a pneumatic tire. The cap 8 supports a valve seat 10 on its upper side which is preferably of rubber and against which seats a low pressure valve 11 having a stem 12, projecting in opposite directions from said valve and being guided by the openings 7 and 9, but being of smaller size than said openings, so as to allow the flow of fluid therethrough around the stem.

A rubber or resilient valve seat 13 is mounted in the chamber 4 in position to receive a high pressure valve 14 having its valve stem 14' projecting in opposite directions, one portion being received in the opening 7 and the other portion being received in an opening 15 in a plug 16 which seals the outer side of the chamber 4. A spring 17 is mounted in the opening 15 and bears against the valve 14 normally tending to hold it on its seat.

The head 2 has a high pressure passageway 18 therethrough and a low pressure passageway 19, the latter being controlled by a check-valve 20.

The casing 1 has a chamber 21 therein having a duct 22 extending therefrom to an air passageway 23 in its outer end which communicates with the low pressure passageway 19. An opening 24 in the casing 1 beside the passageway 22 has a stem 25 fitted therein and carrying a tube 26 communicating with the bore 27 of the stem 25 and also with the passageway 18 of the high pressure valve. The bore 27 has communication therethrough in one direction controlled by a check-valve 28, normally held against its seat by a spring 29. An orifice 30 through one side of the stem 25 communicates with a passageway 31 extending through the casing 1 to be connected with a high pressure pipe 32.

The stem 25 has the inner end portion thereof slotted to receive a T-shaped member 34, a portion of which projects into the bore 27 in position to engage the ball check-valve 28 to unseat the same against the tension of the spring 29. The member 34 may be operated in any suitable manner, such, for instance, as by a bellows arrangement controlled by the pressure in the chamber 21, as set forth in my former application, Serial No. 702,239, filed December 13, 1933, on Air delivery device, in which case the member 34 will unseat the valve to establish communication between the chamber 21 and the passageway 31 whenever the pressure in the chamber 21 is lowered by the opening of the low pressure valve 11.

Whenever the head 2 is pressed on the stem of the tire to inflate the same, the pressure in the chamber 21 will be lowered to that extent so that the member 34 will be moved forward to unseat the valve 28, allowing high pressure from the passageway 31 to flow into the chamber 21 and past the valve 11 into the tire.

If the tire pressure should still be below the set point desired by the operator, the operation would be repeated, delivering another volume of pressure to the tire, and this continues until the tire pressure is raised to a predetermined amount.

If the operator presses strongly on the head 2, the valve stem which normally unseats the valve 11 by engagement with the stem 12 would cause movement of the stem 12 sufficiently to engage the lower end of the stem 14' to unseat the valve 14 allowing the high pressure from the passageway 31 to be communicated through the opening 27, the tube 26 and the passageway 18, and through the opening 7, directly to the valve. This may be used when the pressure of the tire is greatly below the desired pressure or when it contains very little or no pressure, and then when the pressure rises approximately to normal, the operator may lift the head slightly sufficiently to allow the valve 14 to close and thereafter the pressure will be applied through the gauge as above described.

In Fig. 2, I have shown the head as being connected with a double hose for high and low pressure extending directly to separate sources of supply instead of through the gauge.

The construction of the nozzle is the same as shown in Fig. 1, as described above, but the head has tubes 54 and 55 attached to one side thereof communicating respectively with the passageways 18 and 19, and having a hose 56 connected therewith with openings 57 and 58 communicating with the tubes 54 and 55, respectively.

If desired, two separate hoses may be used instead of the single double hose 56. The openings 57 and 58 are adapted to be connected with separate sources 59 and 60, of high and low pressure, respectively, so that when light pressure is applied to the nozzle by the operator, the low pressure is connected with the stem of the tire, whereas when heavy pressure is applied by the operator both valves are unseated and the high pressure is connected to the tire.

The source of supply of containers 59 and 60 may be used to contain different gases, if desired, which will be mixed in passing through the head upon the opening of both valves therein.

This application is a division of my former application on Air delivery device, Serial No. 702,239, filed December 13, 1933, and now Patent No. 2,049,392, granted July 28, 1936.

I claim:

1. In an air delivery device, the combination of a head having high and low pressure valves disconnected for relative movement mounted therein in series, said valves being constructed and arranged for seating movement in the same direction, means for connecting a fluid source with one of said valves, and means for connecting a separate fluid source with the other of said valves.

2. In an air delivery device, the combination of a head having high and low pressure valves mounted therein in series for cooperative action and opening movements successively, said valves being constructed and arranged for seating movement in the same direction, means for connecting a fluid source with one of said valves, and means for connecting a separate fluid source under a different pressure from the first fluid source with the other of said valves.

3. In an air delivery device, the combination of a head having high and low pressure valves disconnected for relative movement mounted therein in series, said valves being constructed and arranged for seating movement in the same direction, means for connecting a source of high pressure with the high pressure valve, and means for connecting a source of low pressure with the low pressure valve.

4. In an air delivery device, the combination of a head having high and low pressure chambers therein, and valves arranged in series and relatively movable and seating in the same direction for controlling the discharge from said chambers, the low pressure valve being arranged to open the high pressure valve upon excess movement.

5. In an air delivery device, the combination of a head having high and low pressure chambers therein, valves arranged in series and relatively movable and seating in the same direction for controlling the discharge from said chambers, the low pressure valve being arranged to open the high pressure valve upon excess movement, means for connecting a source of high pressure with the high pressure chamber, and means for connecting a source of low pressure with the low pressure chamber.

6. An air delivery device comprising a head having separate chambers therein with an integral partition between said chambers, said partition having an opening therein for establishing communication between the chambers, valves mounted in said chambers, one of which valves being arranged to control communication between the chambers and the other of said valves being arranged to control discharge from the chambers, said valves being arranged for series actuation upon the opening of the last-mentioned valve to a substantial extent, and a plug removably inserted into the top portion of the head for closing one of said chambers and being removable to permit withdrawal of the valve mounted therein.

JAMES HARRIS HARDY.